(12) United States Patent
Yu et al.

(10) Patent No.: US 7,672,083 B1
(45) Date of Patent: Mar. 2, 2010

(54) DISK DRIVE WITH TRANSLATABLE RAMP

(75) Inventors: William Wei Yi Yu, Anne Arbor, MI (US); Lidu Huang, Danville, CA (US); Perry E. Hall, Hollister, CA (US); Scott E. Watson, San Jose, CA (US); Kenneth Allen, Felton, CA (US); Lawrence H. Lo, Cupertino, CA (US); David K. Myers, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 368 days.

(21) Appl. No.: 11/352,534

(22) Filed: Feb. 13, 2006

(51) Int. Cl.
*G11B 5/54* (2006.01)
(52) U.S. Cl. .............. 360/254.4; 360/254.5; 360/254.9
(58) Field of Classification Search .............. 360/254.3, 360/254.4, 254.5, 254.9, 255.8, 254.6
See application file for complete search history.

(56) References Cited

U.S. PATENT DOCUMENTS

| | | | | |
|---|---|---|---|---|
| 5,148,339 A | * | 9/1992 | Yoshida .................... | 360/254.7 |
| 5,285,338 A | * | 2/1994 | Sugahara et al. ......... | 360/254.3 |
| 5,486,964 A | | 1/1996 | Morehouse et al. | |
| 5,764,437 A | * | 6/1998 | Meyer et al. ............. | 360/254.3 |
| 5,831,795 A | * | 11/1998 | Ma et al. .................. | 360/254.3 |
| 5,864,448 A | * | 1/1999 | Berberich ................ | 360/254.8 |
| 5,870,255 A | * | 2/1999 | Hornung et al. .......... | 360/254.4 |
| 5,875,074 A | | 2/1999 | Ho et al. | |
| 5,973,886 A | * | 10/1999 | Khuu ...................... | 360/254.5 |
| 5,995,332 A | * | 11/1999 | Patterson ................. | 360/254.6 |
| 6,028,745 A | * | 2/2000 | Nguyen et al. ........... | 360/254.9 |
| 6,057,988 A | * | 5/2000 | Berberich et al. ........ | 360/254.9 |
| 6,091,577 A | * | 7/2000 | Ho et al. .................. | 360/254.9 |
| 6,163,439 A | * | 12/2000 | Jeong ...................... | 360/254.3 |
| 6,201,665 B1 | | 3/2001 | Angellotti et al. | |
| 6,344,950 B1 | | 2/2002 | Watson et al. | |
| 6,424,501 B1 | | 7/2002 | Tsujino et al. | |
| 6,449,129 B1 | | 9/2002 | Macpherson et al. | |
| 6,480,361 B1 | * | 11/2002 | Patterson ................. | 360/254.3 |
| 6,515,959 B1 | * | 2/2003 | Fairchild .................. | 369/300 |
| 6,519,115 B1 | * | 2/2003 | Yaeger .................... | 360/255.7 |
| 6,549,377 B2 | * | 4/2003 | Yoshida et al. .......... | 360/254.3 |
| 6,624,978 B1 | * | 9/2003 | Fairchild ................. | 360/254.6 |
| 6,693,773 B1 | | 2/2004 | Sassine | |
| 6,862,154 B1 | | 3/2005 | Subrahmanyam et al. | |
| 6,941,642 B1 | | 9/2005 | Subrahmanyam et al. | |
| 2001/0033459 A1 | * | 10/2001 | Boutaghou .............. | 360/254.3 |
| 2002/0057533 A1 | * | 5/2002 | Simozato ................ | 360/254.3 |

(Continued)

*Primary Examiner*—Brian E Miller
(74) *Attorney, Agent, or Firm*—Barcelo & Harrison, LLP

(57) ABSTRACT

A disk drive having a translatable ramp is disclosed. The disk drive includes a head gimbal assembly having a proximate end that is attached to an actuator, and a distal end that includes a lift tab. The ramp includes a lift tab supporting surface located as close to a pivot axis of the actuator as is the lift tab. The ramp also includes a ramp guiding surface that is in contact with a mating surface of the disk drive base. A fastener selectively allows or prevents relative translation between the ramp and the disk drive base. The aforementioned contact constrains the relative translation so that the relative translation changes the distance between the lift tab supporting surface and the disk axis of rotation more than the relative translation changes the distance between the lift tab supporting surface and the actuator pivot axis.

16 Claims, 5 Drawing Sheets

U.S. PATENT DOCUMENTS

2002/0071219 A1 * 6/2002 Yoshida et al. ........... 360/254.3
2006/0002028 A1 * 1/2006 Nayar et al. ............. 360/254.9
2007/0008653 A1 * 1/2007 Ohno et al. .............. 360/254.3

* cited by examiner

DISK DRIVE WITH TRANSLATABLE RAMP

FIELD OF THE INVENTION

The present invention relates generally to information storage devices, and in particular to a disk drive having a ramp that can translate relative to a disk drive base.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The spindle motor typically includes a rotating hub on which disks mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Many modern HDAs include a ramp adjacent the disk outer diameter. In such HDAs, each HGA (itself attached to the distal end of an actuator arm in the HSA) typically includes a lift tab. The lift tab is designed to contact a lift tab supporting surface of the ramp when the actuator moves near an extreme position that is typically beyond the disk outer diameter. The interaction between the lift tab and the lift tab supporting surface serves to unload the heads from the surface of the disk when the disk drive is not in use. The benefits of unloading the heads can include improved tribological performance and reliability of the head-disk interface and improved robustness to mechanical shocks that are suffered under non-operating conditions.

However, to prevent the heads from sliding off of the outer edge of the disk before they are properly unloaded, a portion of the ramp (that includes a portion of the lift tab supporting surface) typically must extend over the disk outer diameter. That portion of the ramp overlaps the disk. A consequence of such overlap is that the ramp typically must be removed before the disk(s) or spindle can be removed for rework.

Rework is a significant and costly part of disk drive manufacture; as much as 25% of initially manufactured disk drives require rework. Of course the actuator arms and heads must be completely demerged and unloaded before the disk(s) or spindle can be removed for rework. But the ramp can not facilitate such demerge and unloading after the ramp is removed. Consequently, with contemporary ramp designs, the HSA must be removed using a transfer comb prior to rework or replacement of the disk(s) or spindle.

There are many problems associated with removing the HSA as a prerequisite to rework of the disk(s) or spindle. Firstly, there is the additional time and associated cost of the additional HSA-removal process steps. Secondly, some causes of disk or spindle rework do not imply that there is anything initially wrong with the HSA (e.g. if the servo pattern needs to be externally rewritten, or if the spindle must be replaced, etc). However, after removal, handling, storage, cleaning, and replacement of the relatively expensive and delicate HSA, the HSA itself may then become damaged—by rework intended to remedy an unrelated problem with the disk(s) or spindle. For example, removal of the HSA typically requires prior insertion of a transfer comb that contacts the fragile HGAs. The transfer comb is typically an inexpensive plastic part that has poor dimensional tolerances relative to the ramp, and that can damage the HGAs during insertion. Also for example, cleaning of the HSA typically requires prior removal of its pivot bearing, typically wasting the pivot bearing attachment means (e.g. tolerance ring or C-clip).

Thus, there is a need in the art for an improved ramp configuration that can allow disk or spindle rework/replacement without the need to remove the HSA from the HDA.

SUMMARY

A disk drive having a translatable ramp is disclosed. The disk drive includes a head gimbal assembly having a proximate end that is attached to an actuator, and a distal end that includes a lift tab. The ramp includes a lift tab supporting surface located as close to a pivot axis of the actuator as is the lift tab. The ramp also includes a ramp guiding surface that is in contact with a mating surface of the disk drive base. A fastener selectively allows or prevents relative translation between the ramp and the disk drive base. The aforementioned contact constrains the relative translation so that the relative translation changes the distance between the lift tab supporting surface and the disk axis of rotation more than the relative translation changes the distance between the lift tab supporting surface and the actuator pivot axis.

DESCRIPTION OF THE PREFERRED EMBODIMENTS

Figure 1:
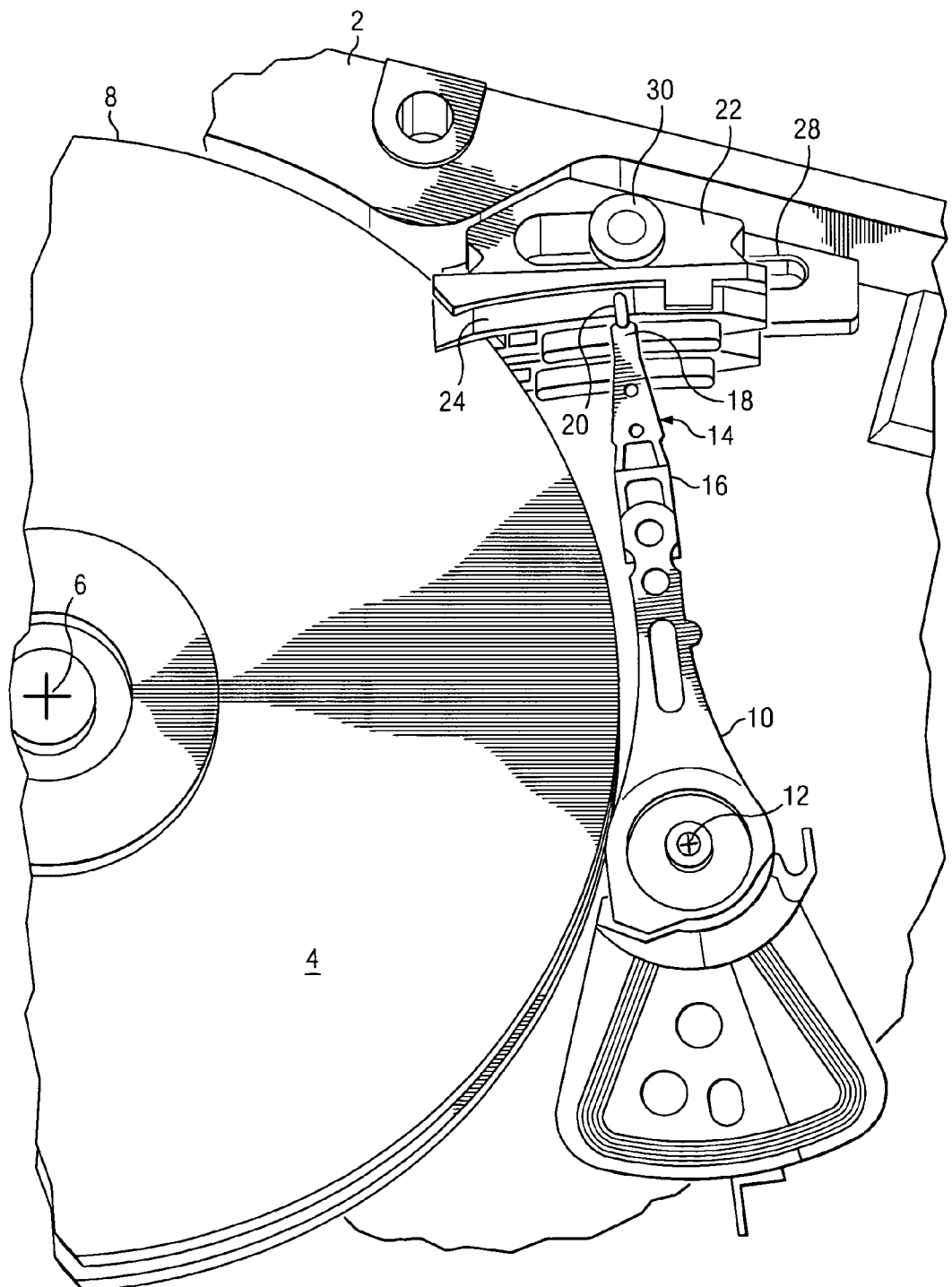
FIG. 1 is a top perspective view of a disk drive according to an embodiment of the present invention.

FIG. 1 is a top perspective view of a disk drive according to an embodiment of the present invention. The disk drive comprises a disk drive base 2 and a disk 4 rotably coupled to the disk drive base 2. The disk defines a disk axis of rotation 6 and has an outer circumference 8. In contemporary magnetic hard disk drive applications, the disk 4 may comprise an aluminum, glass, or ceramic substrate, with substrate being coated with a NiP under-layer, a thin-film magnetic layer, a diamond-like amorphous carbon protective layer, and a very thin lubricant layer.

An actuator 10 is coupled to the disk drive base 2 and defines an actuator pivot axis 12. The actuator 10 is typically fabricated from aluminum, magnesium, or stainless steel, and pivots about a pivot bearing that is inserted as a cartridge into a bore in the actuator. The pivot bearing cartridge is typically retained in the bore by a C-clip or tolerance ring (not shown) but may be otherwise retained (e.g. by an adhesive).

A head gimbal assembly (HGA) 14 includes a proximate end 16 that is attached to the actuator 10, and a distal end 18 that includes a lift tab 20. The HGA supports a read head (not shown) at its distal end. The HGA typically includes a "gimbal" or "flexure" that includes conductive traces that electrically connect the read head to other circuitry in the disk drive (e.g. a preamp via a flex cable). The flexure also serves to attach the read head to the HGA in a compliant manner. For example, the read head may be glued and soldered to the flexure, and the flexure may be spot-welded to the remainder of the HGA. For simplicity, the flexure is not shown in FIG. 1.

A ramp 22 includes a lift tab supporting surface 24 located as close to the actuator pivot axis 12 as is the lift tab 20. During normal operation, a portion of the lift tab supporting surface 24 extends over the outer circumference 8 of the disk 4. When the actuator 10 swings the HGA 14 away from the disk axis of rotation 6 near and beyond the outer circumference 8 of disk 4, contact between the lift tab 20 and the lift tab supporting surface 24 separates or "unloads" the read head from the surface of the disk 4. After such unloading, the ramp 22 and its lift tab supporting surface 24 supports the distal end 18 of HGA 14 via its lift tab 20, rather than the disk providing such support.

Figure 2:
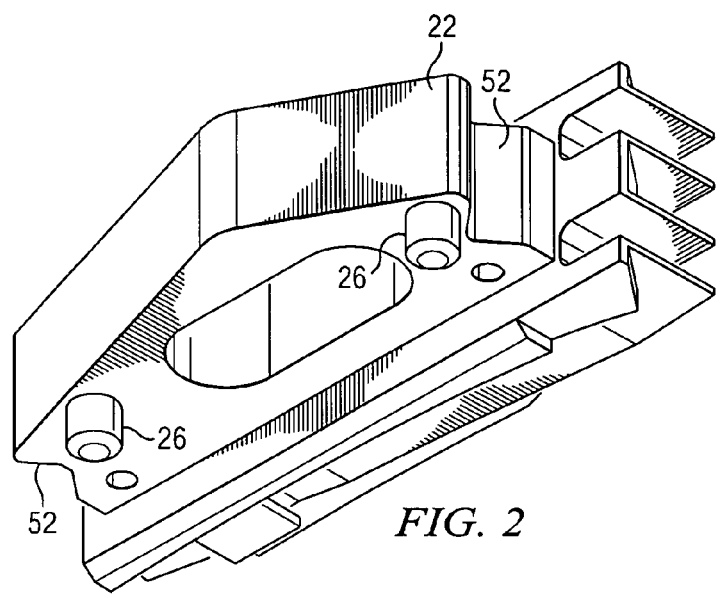
FIG. 2 is a bottom perspective view of a ramp according to an embodiment of the present invention.
Figure 3:
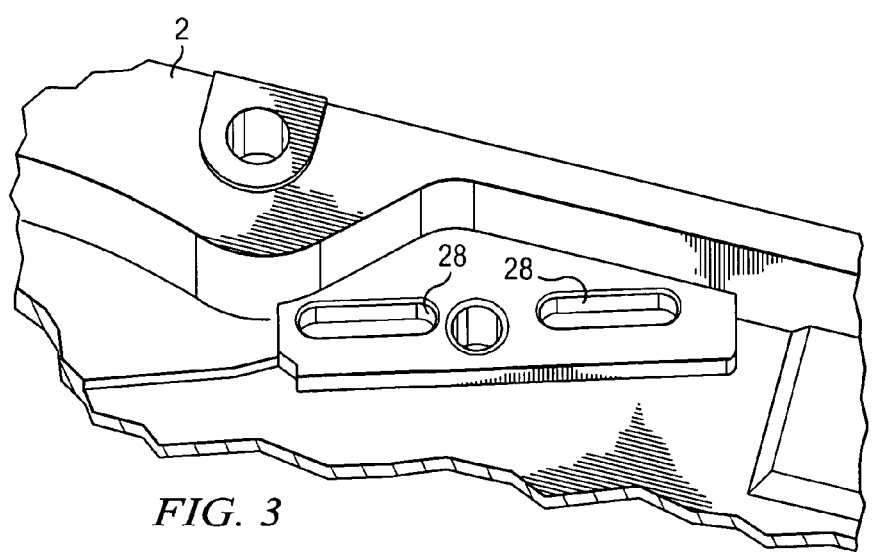
FIG. 3 is a top perspective view of a portion of a disk drive base according to an embodiment of the present invention.

Referring now to FIG. 2, the ramp 22 also includes a ramp guiding surface. In the embodiment of FIG. 2, the ramp guiding surface comprises an outer surface of pins 26 that protrude from ramp 22. The pins 26 are in contact with a mating surface of the disk drive base 2. In the exemplary embodiment of FIG. 3, the mating surface comprises an inner surface of grooves 28 formed in disk drive base 2.

A fastener 30 is configured to selectively allow or prevent relative translation between the ramp 22 and the disk drive base 2. In the embodiment of FIG. 1, the fastener 30 may be a screw passing through a slot in the ramp 22 into a threaded hole in the disk drive base 2. In certain other embodiments, the fastener may be a snap-fit frictional interface between an inner surface of a slot in the ramp and an outer surface of a pin protruding from the disk drive base.

In certain embodiments, the ramp 22 comprises first material at the lift tab supporting surface 24 and the ramp comprises a second material of relatively higher compressive strength adjacent the fastener 30. Preferably, the first material will have a compressive strength less than 100 MPa, and the second material will have a compressive strength greater than 100 MPa. For example, the first material could include acetyl homopolymer (POM) and the second material could include a polyetherimide such as the material presently known as Ultem 1000.

The contact between the ramp guiding surface 26 and the mating surface 28 constrains the relative translation so that the relative translation changes the distance between the lift tab supporting surface 24 and the disk axis of rotation 6 more than the relative translation changes the distance between the lift tab supporting surface 24 and the actuator pivot axis 12.

Preferably, the relative translation is oriented and of sufficient extent to allow the lift tab supporting surface 24 to translate away from the disk axis of rotation 6 to a position outside the disk outer circumference 8, while keeping the lift tab supporting surface 24 close enough to the actuator pivot axis 12 to remain within reach of the lift tab 20. Preferably, the relative translation can change the distance between the lift tab supporting surface 24 and the disk axis of rotation 6 by as much as 1 mm but no more than 6 mm. Preferably, the relative translation is oriented and of sufficient extent to eliminate any overlap of the lift tab supporting surface 24 over the disk outer circumference 8. Such sufficient relative translation is depicted, for example, in FIG. 4. Note that the disks may be removed in FIG. 4 without interference from the ramp 22 (including its lift tab supporting surface 24) or from the HGA 14 or any other portion of actuator 10.

Preferably, the smallest angle between the relative translation and a line drawn from the lift tab supporting surface 24 to the disk axis of rotation 6 is smaller than the smallest angle between the relative translation and a line drawn from the lift tab supporting surface 24 to the actuator pivot axis 12.

In certain embodiments, it is preferable for the ramp 22 to include a material that is opaque. This is because opaque materials can be detected more easily by automated vision systems that are sometimes used in disk drive manufacturing and testing apparatus. For example, automated vision systems are sometimes used during disk drive assembly to position the ramp, and/or to check that the vertical separation between the lift tab supporting surface of the ramp and the disk surface is proper (i.e. within specified tolerances) after assembly. The use of automated vision systems to measure the minimum clearance between the ramp and the disk outer diameter after retraction during re-work is sometimes also desirable. In certain embodiments such a minimum clearance might fall within the range 0.2 to 1.5 mm.

Figure 5:
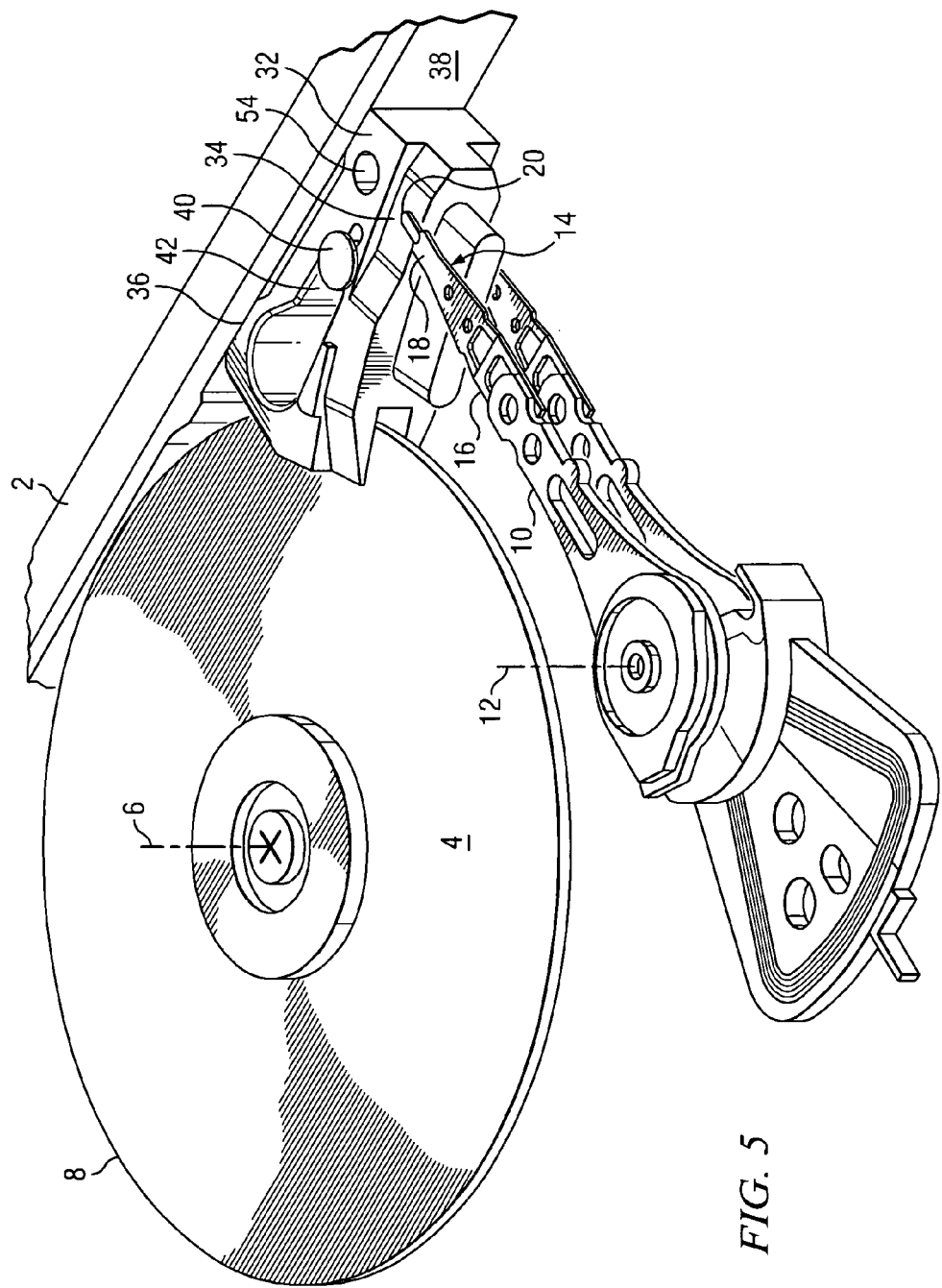
FIG. 5 is a perspective view of a disk drive according to an embodiment of the present invention.

FIG. 5 is a perspective view of a disk drive according to an embodiment of the present invention.

In the embodiment of FIG. 5, a ramp 32 includes a lift tab supporting surface 34 located as close to the actuator pivot axis 12 as is the lift tab 20. During normal operation, a portion of the lift tab supporting surface 34 extends over the outer circumference 8 of the disk 4. When the actuator 10 swings the HGA 14 away from the disk axis of rotation 6 near and beyond the outer circumference 8 of disk 4, contact between the lift tab 20 and the lift tab supporting surface 34 separates or "unloads" the read head from the surface of the disk 4. After such unloading, the ramp 32 and its lift tab supporting surface 34 supports the distal end 18 of HGA 14 via its lift tab 20, rather than the disk providing such support.

Figure 6:
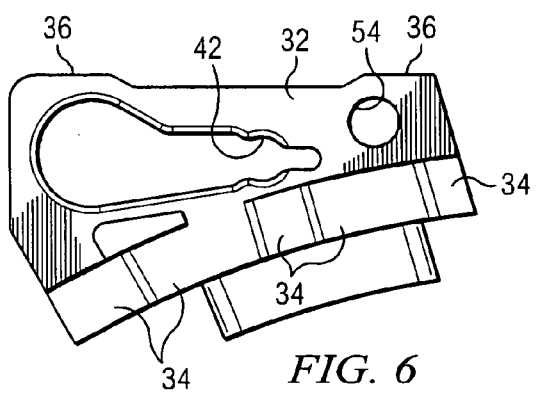
FIG. 6 is a top view of a ramp according to an embodiment of the present invention.
Figure 7:
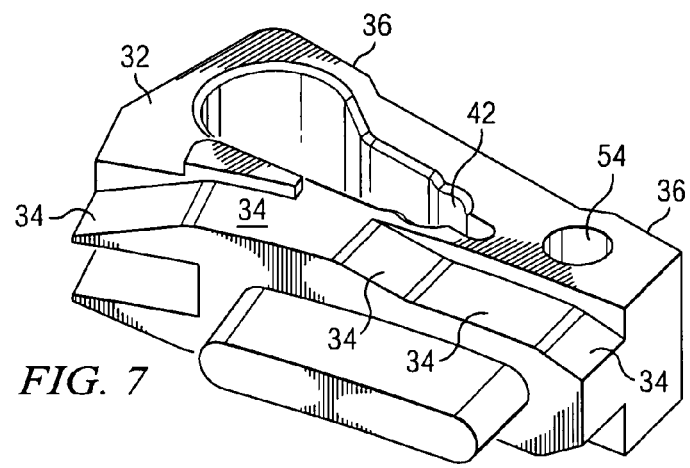
FIG. 7 is a perspective view of a ramp according to an embodiment of the present invention.

Referring now to FIGS. 5-7, the ramp 32 also includes two ramp guiding surfaces 36. The ramp guiding surfaces 36 are in contact with a mating surface 38 of the disk drive base 2. In the exemplary embodiment of FIGS. 5-7, the mating surface 38 is a surface of the disk drive base 2.

In the exemplary embodiment of FIGS. 5-7, a snap-fit attachment selectively allows or prevents relative translation between the ramp 32 and the disk drive base 2. The snap-fit attachment accomplishes this via a resilient interface between an inner surface 42 of a slot in the ramp 32 and an outer surface of a pin 40 protruding from the disk drive base 2.

In certain embodiments, the ramp guiding surface 36 is a flat outer surface of the ramp 32 that lies in a plane that is parallel to the actuator pivot axis 12, and the mating surface 38 is a flat inner surface of the disk drive base 2 that lies in an adjacent plane that is also parallel to the actuator pivot axis 12.

Figure 4:
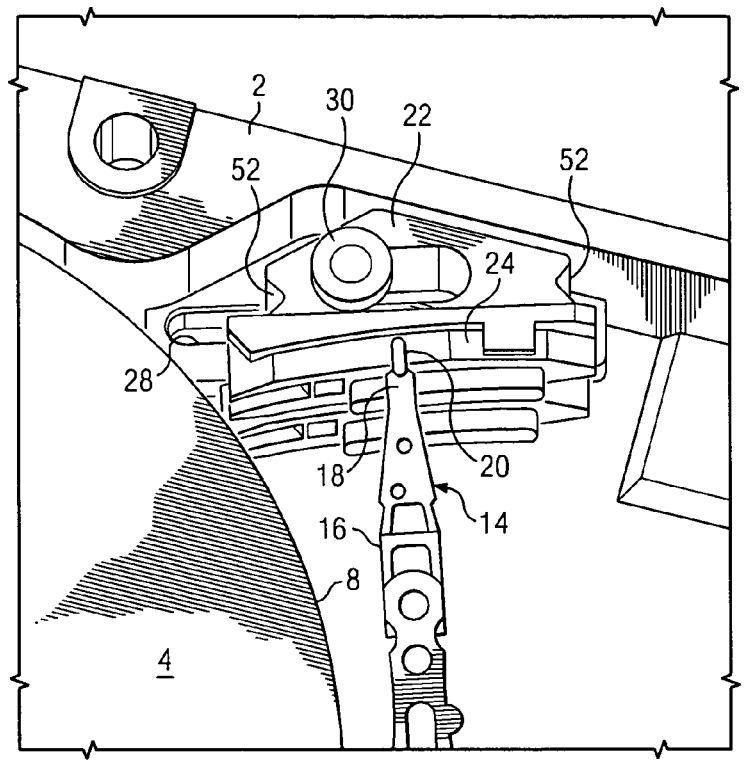
FIG. 4 is a top perspective view of a disk drive according to an embodiment of the present invention, wherein the ramp has been fully translated away from its normal-operation position to facilitate removal of the disks for rework.
Figure 8:
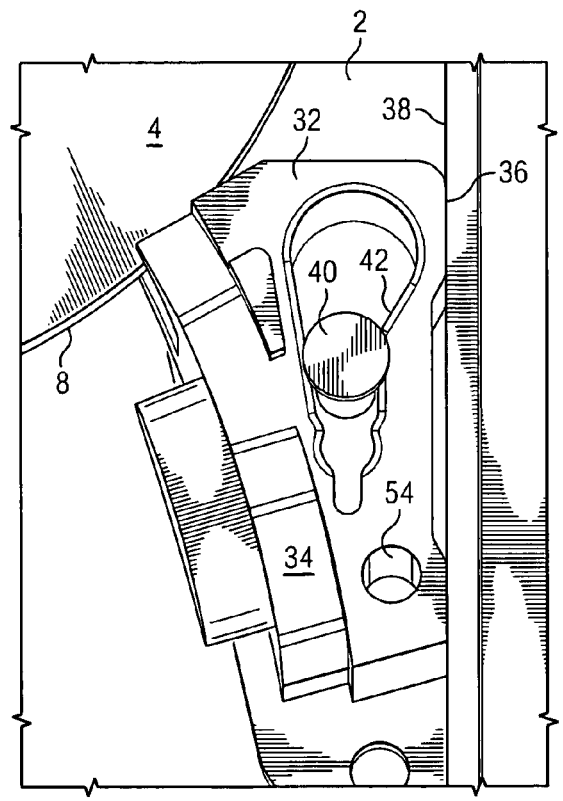
FIG. 8 is a top perspective view of a snap-fit ramp within a disk drive according to an embodiment of the present invention, the ramp having been partially translated out of its normal operating position.

In certain embodiments, the ramp further includes a recession for temporary receipt of a relative translation inducing tool. The relative translation inducing tool is used during disk drive assembly or re-work, and is not a part of the disk drive being assembled. For example, the recession could comprise two opposing V-shaped notches 52 as depicted in FIG. 2 and FIG. 4. Also for example, the recession could comprise a tooling hole 54 as depicted in FIGS. 6-8.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A disk drive comprising:
   a disk drive base;
   a disk rotably coupled to the disk drive base, the disk defining a disk axis of rotation and having an outer circumference;
   an actuator coupled to the disk drive base, the actuator defining an actuator pivot axis;
   a head gimbal assembly that includes a proximate end that is attached to the actuator, and a distal end, the distal end including a lift tab;
   a ramp, the ramp including a lift tab supporting surface located as close to the actuator pivot axis as is the lift tab, a portion of the lift tab supporting surface extending over the outer circumference of the disk with the ramp in a normal operating position, the ramp also including a ramp guiding surface, the ramp guiding surface being in contact with a mating surface of the disk drive base; and
   a fastener configured to selectively allow or prevent relative translation between the ramp and the disk drive base;
   wherein said contact between the ramp guiding surface and the mating surface constrains the relative translation so that the relative translation changes the distance between the lift tab supporting surface and the disk axis of rotation more than the relative translation changes the distance between the lift tab supporting surface and the actuator pivot axis; and
   wherein the relative translation is oriented and of sufficient extent to allow the ramp to translate from the normal operating position away from the disk axis of rotation to a second position where the entire ramp is outside the disk outer circumference, while keeping the lift tab supporting surface close enough to the actuator pivot axis to remain within reach of the lift tab.

2. The disk drive of claim 1 wherein the smallest angle between the relative translation and a line drawn from the lift tab supporting surface to the disk axis of rotation is smaller than the smallest angle between the relative translation and a line drawn from the lift tab supporting surface to the actuator pivot axis.

3. The disk drive of claim 1 wherein the ramp guiding surface is an outer surface of a pin protruding from the ramp, and the mating surface is an inner surface of a groove in the disk drive base.

4. The disk drive of claim 1 wherein the ramp guiding surface is an inner surface of a groove in the ramp, and the mating surface is the outer surface of a pin protruding from the disk drive base.

5. The disk drive of claim 1 wherein the fastener is a screw passing through a slot in the ramp into a threaded hole in the disk drive base.

6. The disk drive of claim 1 wherein the fastener is a snap-fit frictional interface between an inner surface of a slot in the ramp and an outer surface of a pin protruding from the disk drive base.

7. The disk drive of claim 6 wherein the ramp guiding surface is a flat outer surface of the ramp that lies in a plane that is parallel to the actuator pivot axis, and the mating surface is a flat inner surface of the disk drive base that lies in an adjacent plane that is also parallel to the actuator pivot axis.

8. The disk drive of claim 1 wherein the relative translation can change the distance between the lift tab supporting surface and the disk axis of rotation by as much as 1 mm but no more than 6 mm.

9. The disk drive of claim 1 wherein the ramp further includes a recession for temporary receipt of a relative translation inducing tool, the relative translation inducing tool not being a part of the disk drive.

10. The disk drive of claim 9 wherein the recession comprises a tooling hole.

11. The disk drive of claim 1 wherein the ramp comprises an opaque material.

12. A disk drive comprising:
    a disk drive base;
    a disk rotably coupled to the disk drive base, the disk defining a disk axis of rotation and having an outer circumference;
    an actuator coupled to the disk drive base, the actuator defining an actuator pivot axis;
    a head gimbal assembly that includes a proximate end that is attached to the actuator, and a distal end, the distal end including a lift tab;
    a ramp, the ramp including a lift tab supporting surface located as close to the actuator pivot axis as is the lift tab, the ramp also including a ramp guiding surface, the ramp guiding surface being in contact with a mating surface of the disk drive base; and
    a fastener configured to selectively allow or prevent relative translation between the ramp and the disk drive base;
    wherein said contact between the ramp guiding surface and the mating surface constrains the relative translation so that the relative translation changes the distance between the lift tab supporting surface and the disk axis of rotation more than the relative translation changes the distance between the lift tab supporting surface and the actuator pivot axis; and wherein the ramp comprises first material at the lift tab supporting surface and the ramp comprises a second material of relatively higher compressive strength adjacent the fastener.

13. The disk drive of claim 12 wherein the first material has a compressive strength less than 100 MPa, and the second material has a compressive strength greater than 100 MPa.

14. The disk drive of claim 13 wherein the first material includes acetyl homopolymer and the second material includes polyetherimide.

15. A disk drive comprising:
a disk drive base;
a disk rotably coupled to the disk drive base, the disk defining a disk axis of rotation and having an outer circumference;
an actuator coupled to the disk drive base, the actuator defining an actuator pivot axis;
a head gimbal assembly that includes a proximate end that is attached to the actuator, and a distal end, the distal end including a lift tab;
a ramp, the ramp including a lift tab supporting surface located as close to the actuator pivot axis as is the lift tab, the ramp also including a ramp guiding surface, the ramp guiding surface being in contact with a mating surface of the disk drive base; and
a fastener configured to selectively allow or prevent relative translation between the ramp and the disk drive base;
wherein said contact between the ramp guiding surface and the mating surface constrains the relative translation so that the relative translation changes the distance between the lift tab supporting surface and the disk axis of rotation more than the relative translation changes the distance between the lift tab supporting surface and the actuator pivot axis; and
wherein the relative translation is oriented and of sufficient extent to allow the lift tab supporting surface to translate away from the disk axis of rotation to a position outside the disk outer circumference, while keeping the lift tab supporting surface close enough to the actuator pivot axis to remain within reach of the lift tab,
wherein the ramp further includes a recession for temporary receipt of a relative translation inducing tool, the relative translation inducing tool not being a part of the disk drive, and
wherein the recession comprises two opposing V-shaped notches.

16. A disk drive comprising:
a disk drive base;
a disk rotably coupled to the disk drive base, the disk defining a disk axis of rotation and having an outer circumference;
an actuator coupled to the disk drive base, the actuator defining an actuator pivot axis;
a head gimbal assembly that includes a proximate end that is attached to the actuator, and a distal end, the distal end including a lift tab;
a ramp, the ramp including a lift tab supporting surface located as close to the actuator pivot axis as is the lift tab, a portion of the lift tab supporting surface extending over the outer circumference of the disk with the ramp in a normal operating position, the ramp also including a ramp guiding surface, the ramp guiding surface being in contact with a mating surface of the disk drive base; and
a fastener configured to selectively allow or prevent relative translation between the ramp and the disk drive base;
wherein said contact between the ramp guiding surface and the mating surface constrains the relative translation so that the relative translation changes the distance between the lift tab supporting surface and the disk axis of rotation more than the relative translation changes the distance between the lift tab supporting surface and the actuator pivot axis; and
wherein the relative translation is oriented and of sufficient extent to eliminate any overlap of the ramp over the disk outer circumference.

* * * * *